Jan. 30, 1951  M. P. WINTHER  2,539,649
CLUTCH CONTROL
Filed Feb. 2, 1949
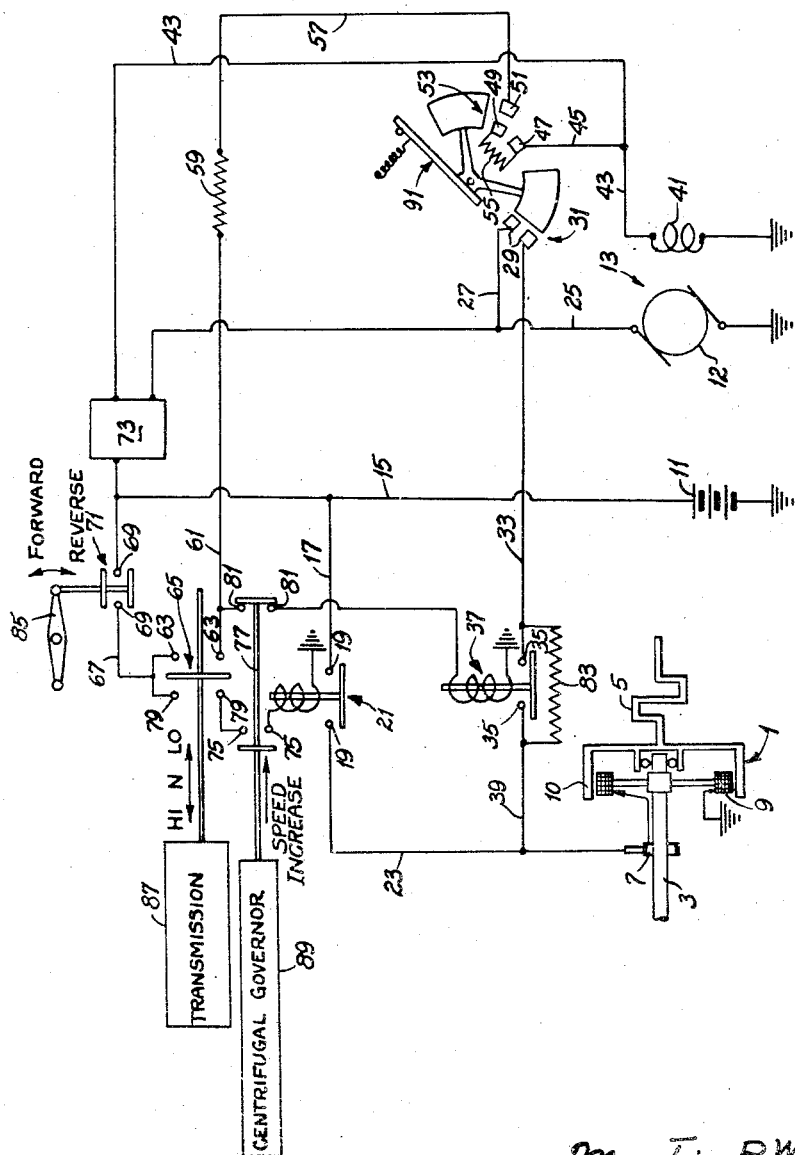
Martin P. Winther,
Inventor.
Haynes and Koenig
Attorneys.

Patented Jan. 30, 1951

2,539,649

UNITED STATES PATENT OFFICE 2,539,649

CLUTCH CONTROL

Martin P. Winther, Gates Mills, Ohio., assignor to Martin P. Winther, as trustee Application February 2, 1949, Serial No. 74,220

16 Claims. (Cl. 192—.076)

1

This invention relates to clutch controls and more particularly to automotive clutch controls.

Among the several objects of this invention are the provision of a clutch control, particularly applicable to automatic drives, which will smoothly modulate the operation of an automotive clutch mechanism to place it in engagement in response to change in engine speed; the provision of a clutch control of the class described which will modulate a clutch mechanism at a rate determined by throttle position; the provision of a clutch control of this class which will maintain a clutch mechanism fully engaged during high gear operation while permitting modulation of the clutch mechanism in low and reverse speed operations; and, the provision of a clutch control of this class which will insure transmission gear engagements without tooth interference or hanging. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, the single figure is a circuit and mechanical diagram of the invention.

Referring now more particularly to the drawing, there is indicated at numeral 1 a clutch adapted when engaged to connect a driven shaft 3 (which may be connected with the wheels of an automobile) with a driving motor or engine member 5 (which may be an automotive engine). Clutch 1, which may be any type of electrically controlled clutch, includes a brush connection 7 for supplying electrical energy to its field member 9 which is affixed to shaft 3. Its inductor or armature is shown at 10. A typically useful clutch is the so-called eddy-current clutch, in which excitation of the field 9 results in the production of a magnetic field interlinking poles on the field member and the inductor 10 (see, for example, United States Patents 1,982,461 and 2,449,779). Upon rotation of the inductor 10, the field member 9 follows, with some rotary slip which (with increase in the excitation) decreases toward but not quite to synchronism. With some clutches of this type employing magnetic fluids or semi-solids, complete synchronism may be obtained at maximum excitation (see my U. S. Patent 2,525,571, for Dynamoelectric Machine). A slip engagement with final synchronism may also

2 be obtained with electromagnetically operated friction clutches, an example of which may be found in U. S. Patent 2,395,772.

Exciting current for clutch 1 may be supplied from either of two sources, a storage battery 11, or an electrical generator unit 13. The electrical network or circuit connecting battery 11 to clutch 1 includes a wire 15, a wire 17, switch contacts 19 of a relay 21, and a wire 23. Clutch 1 also may be energized through a second network or circuit including armature 12 of generator 13, wires 25 and 27, contacts 29 of a throttle-operated switch 31, a wire 33, switch contacts 35 of a second relay 37 and a wire 39. Throttle 91 controls the speed of the prime mover 5.

The generator 13 is provided with a shunt field winding 41 which is adapted to be variably energized by either of two electrical networks or circuits. One of these includes wires 43 and 45, contacts 47, 49 and 51 of a second throttle-operated switch 53, a resistor 55, a wire 57, a resistor 59, wire 61, a pair of contacts 63 of a transmission responsive switch 65, a wire 67, a pair of contacts 69 of a forward-reverse switch 71 and wire 15. The generator field 41 may be more directly energized by means of a second network or circuit including only wire 43 and a voltage regulator unit 73.

Relay 21, which when energized operates to close contacts 19 and thus complete the electrical circuit above described between brush 7 and battery 11, is connected in a circuit including contacts 75 of a governor operated switch 77; contacts 79 of the transmission responsive switch 65; wire 67; and contacts 69 of forward-reverse switch 71. Relay 37, which operates when energized to complete the circuit between clutch 1 and generator 13, is connected in a circuit including a second set of contacts 81 of governor operated switch 77; contacts 63 of the transmission responsive switch 65; wire 67; and contacts 69 of forward-reverse switch 71. A resistor 83 is connected in shunt across contacts 35.

Completion of all the above-described circuits and networks is through the several ground connections indicated.

The circuit illustrated comprises a plurality of electrical components cooperatively arranged so as variably to energize clutch 1 in response to several conditioning mechanisms. These conditioning mechanisms may include, for example, a linkage to a forward-reverse control lever 85, such as is shown controlling the positioning of switch 71; a connection to the automative transmission 87, such as is illustrated for actuating switch 65; a centrifugal governor 89, responsive to car speed, as is shown for control of switch 81; and the speed control or throttle 91 which is associated with switches 31 and 53.

Operation is as follows:

The driving member or engine 5 has a rotational speed dependent upon the positioning of throttle 91. Initially, it is assumed that this speed is in the idling range and that the forward-reverse lever 85 is in forward position, closing contacts 69 of switch 71. At this time switch 65 is in its right position closing contacts 63 of switch 65, and switch 77 is in its left position closing contacts 81, as shown. The coil of relay 37 is thereby energized from battery 11 through wire 15, switch 71, contacts 63 of switch 65, contacts 81 of switch 77, and the ground connections. This action closes relay contacts 35, and if the throttle 91 is moved clockwise contacts 27 and 29 of switch 31 are closed. Clutch 1 will be gradually electrically modulated to drive, due solely to the current flowing through contacts 27 and 29. The value of this current is a function of the rotational speed of armature 12 and the residual magnetism of its field pieces, as field 41 is not yet energized. It will be understood that generator 13 is driven from the automotive engine of which 5 is a part, as by means of a belt or gears.

Upon further depression of throttle 91, contacts 49 and 51 of switch 53 are closed thus energizing the generator field 41 through resistors 55 and 59 from battery 11. It will be noted that this circuit to battery 11 is through the contacts 63 and 69. The amount of current flowing through clutch member 9 is still dependent upon the rotational speed of armature 12 but now, inasmuch as field 41 is energized by battery 11, the potential developed by generator 13 is greater than when only residual magnetism is the field excitation source.

Further clockwise depression of throttle 91 closes contact 47 of switch 53 to shunt out resistor 55 and thus intensify the field current of generator 13 to increase current flow through clutch field 9. When the voltage of generator 13 exceeds a predetermined value the current cutout and voltage regulator 73 closes the circuit between wires 15 and 43 to energize field 41 directly from battery 11, rather than through switches 71 and 65. The armature 12, which is "floating" at idling speed in relation to battery 11 is also connected by and through regulator 73 to battery 11 when a predetermined potential of generator 13 is exceeded. The amount of this charge delivered to battery 11 is dependent upon its state of charge.

Thus it can be seen that as the operator gradually increases the motor speed, clutch 1 is gradually modulated to accelerate the driven member 3, the source of energization being first dependent upon residual magnetism, then upon the resistance of resistors 55 and 59, and finally upon the resistance of 59. However, through all these stages a controlling variable is the generator armature speed which in turn depends upon engine speed.

It is to be noted that if a high rate of clutch coupling is desired the operator merely depresses throttle 91 rapidly which immediately shunts out resistor 55 and fully energizes the generator field 41 from battery 11 through resistor 59. The value of resistor 59 is dependent upon the characteristics of the generator and may be omitted entirely if the generator design will permit.

It has been assumed that the switch 65 would be in its right position initially and that switch 71 was moved upwards to close contacts 69. However, either or both of these switches may be arranged to prevent clutch closure if the transmission gears will not mesh into a low gear ratio. If such gear blocking occurs (as is sometimes the case due to tooth interference) the circuit to the coil of relay 37 will be incomplete and contacts 35 will remain open. If throttle 91 is depressed at such time a small amount of current will be delivered to clutch field 9 from the generator 13 through shunt resistor 83. This will "inch" or slowly move shaft 3 so as to permit the transmission gears to mesh. Upon this meshing, switches 65 and/or 71 will close, and the normal operation described above will occur.

When the speed of the vehicle increases to a predetermined value the centrifugal governor 89 will act to move switch 71 to the right closing contacts 75 and opening contacts 81. At substantially the same time transmission 81 will cause movement of switch 65 to the left and close contacts 19. This movement is due to automatic or manual action of the transmission, depending upon what type it is. These two switch actions (switch 71 remaining closed at all forward speeds) complete the circuit for the coil of relay 21, thus closing contacts 19. Clutch member 9 is thereby energized directly from battery 11 through contacts 19 to a fully coupled condition in which state it remains as long as the vehicle speed exceeds that which operates the transmission and centrifugal governor. As is known, the transmission and governor may be arranged to retain the gears in a high speed gear ratio when the car momentarily slows down to a speed below the predetermined speed determining operation of switches 65 and 71. Such a transmission is described, for example, in the copending U. S. patent application of myself and Anthony Winther, Serial No. 593,236, filed May 11, 1945.

The operation of the clutch control apparatus in reverse speed is identical with that described above for starting in forward speed, except that linkage 85 will be positioned in "Reverse" position to close contacts 69 by the downward movement of switch 71. It is preferred that in reverse position of arm 85, switch 21 be locked in an open condition by any conventional interlock arrangement.

It is to be understood that many types of transmissions may be used in conjunction with the present clutch control circuit such as fully automatic, semi-automatic and manually operable transmissions, provided in each case that the high-low (Hi-Lo) shift is caused to occur at a proper time.

It is also to be noted that although one of the conditioning mechanisms is a centrifugal governor such as 89 responsive to car speed, this may be replaced by other conditioning mechanisms, such as devices responsive to throttle positioning, manifold vacuum, torque or other variables. Also, the cooperative effects of any combinations of the above variables could be used to condition switches 65 and 77.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A control for an electrically energized and modulated clutch driven by a prime mover which drives a generator, the generator having an armature and a field coil energized from a battery, said prime mover having a speed control therefor; comprising a first circuit connecting the armature with the clutch, a second circuit connecting said field coil with the battery, and a switch in said second circuit responsive to said speed control for connecting the field coil with the battery.

2. A control for an electrically energized and modulated clutch driven by a prime mover which drives a generator, the generator having an armature and a field coil energized from a battery, said prime mover having a speed control therefor; comprising a first circuit connecting the armature with the clutch, a second circuit connecting said field coil with the battery and including a resistance, and a switch in said second circuit responsive to said speed control for sequentially first connecting the field coil with the battery through said resistance and secondly without said resistance.

3. A control for an electrically energized and modulated clutch driven by a prime mover which drives a generator, the generator having an armature and a field coil energized from a battery, said prime mover having a speed control therefor; comprising a first circuit connecting the armature with the clutch, a first switch responsive to said speed control in the direction of speed increase adapted to close said first circuit, a second circuit connecting said field coil with the battery, and a second switch in said second circuit also responsive to said speed control for connecting the battery with said field coil, said second switch being sequentially operative after said first switch in response to movement of said speed control toward positions of speed increase.

4. A control for an electrically energized and modulated clutch driven by a prime mover which drives a generator, the generator having an armature and a field coil energized from a battery, said prime mover having a speed control therefor; comprising a first circuit connecting the armature with the clutch, a second circuit connecting said field coil with the battery, a switch in said second circuit responsive to said speed control for connecting the field coil with said battery, and a switch in said first circuit responsive to a predetermined speed of the driven member of the clutch to open.

5. A control for an electrically energized and modulated clutch driven by a prime mover which drives a generator adapted to feed a battery, said prime mover having a speed control therefor; comprising a first circuit connecting the generator with the clutch, and a switch responsive to said speed control in the direction of speed increase adapted to close said circuit, a second circuit connecting the clutch with the battery, a second switch in said second circuit, and a governor responsive to a variable associated with the action of said prime mover adapted to close said second switch in response to said variable.

6. A control for an electrically energized and modulated clutch driven by a prime mover which drives a generator adapted to feed a battery, said prime mover having a speed control therefor; comprising a first circuit connecting the generator with the clutch, and a switch responsive to said speed control in the direction of speed increase adapted to close said circuit, a second circuit connecting the clutch with the battery, a second switch in said second circuit, and a governor responsive to speed of the driven element of the clutch adapted to close said second switch in response to a predetermined rise in speed.

7. A control for an electrically energized and modulated clutch for a driven member and driven by a prime mover which drives a generator, the generator having an armature and a field coil energized from a battery, said prime mover having a speed control therefor; comprising a first circuit connecting the armature with the clutch, a second circuit connecting said field coil with the battery, a switch in said second circuit responsive to said speed control for connecting the battery with said field coil, the battery being interconnected with the clutch through a second switch, and a governor responsive to the speed of said driven member and adapted to close said second switch in response to a predetermined value of said speed.

8. A control for an electrically energized and modulated clutch driving a selective transmission and driven by a prime mover which drives a generator, said prime mover having a speed control therefor; comprising a circuit including a first switch, a second switch, and a resistance connecting the generator with the clutch, said first switch being normally open and responsive to said speed control in the direction of speed increase to close, said resistance being in shunt with said second switch, and elements responsive to selective action of the transmission adapted to close said second switch only when said selective action can be completed.

9. In a power transmission system including a prime mover, a speed control for controlling the speed of said prime mover, a storage battery, a generator responsive to the prime mover speed and having an armature and a field, and an electrically actuated clutch adapted to transmit increased torque with increased energization; a clutch control circuit comprising the generator armature, a first electrical network including a first switch interconnecting said armature and said clutch, and a second electrical network including a second switch interconnecting said battery and said field, said first switch being responsive to an initial actuation of said throttle to complete said first electrical network and thus effect progressive energization of said clutch through said first network, the degree of this energization being a function of prime mover speed and the residual magnetism of said generator, and said second switch being responsive to further actuation of the speed control to excite said field from said battery through said second network.

10. In a power transmission system including a prime mover, a throttle for controlling the speed of said prime mover, a storage battery, a generator responsive to the prime mover speed and having an armature and a field, and an electrically actuated clutch adapted to transmit increased torque with increased energization; a clutch control circuit comprising the generator armature, a first electrical network including a first switch interconnecting said armature and said clutch, and a second electrical network including a second switch and a resistance interconnecting said battery and said field, said first switch being responsive to an initial actuation of said throttle to complete said first electrical network and thus effect progressive energization of said clutch through said first network, the degree of the energization being a function of armature speed and the residual magnetism of said generator, and said second switch being responsive to further actuation of the throttle to excite said field from said battery through said second network, said second switch being responsive to still further throttle actuation to shunt said resistance.

11. Clutch control apparatus for a prime mover having a throttle for controlling the speed of said prime mover, comprising an electrical generator driven by said prime mover and having a potential output which is a function of the prime mover speed, a clutch responsive to an increasing electrical potential to transfer increased torque to a transmission, a first electrical network including a switch and interconnecting said clutch and said generator, and a second electrical network including a second switch and interconnecting the clutch and a storage battery, said first switch being responsive to movement of said throttle to close and thus progressively energize said clutch member in response to increasing prime mover speed, said second switch being responsive to transmission speed and being adapted to close when said transmission speed exceeds a predetermined value thus to transfer maximum torque to said transmission through said clutch from said prime mover.

12. Clutch control apparatus for a prime mover having a throttle for controlling the speed of said prime mover, comprising an electrical generator driven by said prime mover and having a potential output which is a function of the prime mover speed, a clutch responsive to an increasing electrical potential to transfer increased torque to a transmission, a first electrical network including two switches and interconnecting said clutch and said generator, and a second electrical network including a third switch and interconnecting the clutch and a storage battery, said first switch being responsive to movement of said throttle to close and thus progressively energize said clutch in response to increasing prime mover speed, said second switch being adapted to open when the transmission speed exceeds a predetermined value, said third switch being responsive to transmission speed to close when said transmission speed exceeds a predetermined value and thus transfer maximum torque to said transmission through said clutch from said prime mover.

13. Clutch control apparatus for a prime mover having a throttle for controlling the speed of said prime mover, comprising an electrical generator driven by said prime mover and having a potential output which is a function of the prime mover speed, said generator having an armature and a field, a clutch responsive to an increasing electrical potential to transfer increased torque to a transmission, a first electrical network including a switch and interconnecting said clutch and said armature, a second electrical network including a second switch and interconnecting said field and a storage battery, and a third electrical network including a third switch and interconnecting the clutch and said battery, said first switch being responsive to initial movement of said throttle to close and thus progressively energize said clutch member in response to increasing prime mover speed, said second switch being responsive to further movement of said throttle to excite said field from said battery through said second network, said third switch being responsive to transmission speed and adapted to close when said transmission speed exceeds a predetermined value and thus transfer maximum torque to said transmission through said clutch from said prime mover.

14. Clutch control apparatus for a prime mover having a throttle for controlling the speed of said prime mover, comprising an electrical generator driven by said prime mover and having a potential output which is a function of the prime mover speed, said generator having an armature and a field, a clutch responsive to an increasing electrical potential to transfer increased torque to a transmission, a first electrical network including two switches and interconnecting said clutch and said armature, a second electrical network including a third switch and interconnecting said field and storage battery, and a third electrical network including a fourth switch and interconnecting the clutch and said battery, said first switch being responsive to initial movement of said throttle to close and thus progressively energize said clutch member in response to increasing prime mover speed, said second switch being adapted to open when the transmission speed exceeds a predetermined value, said third switch being responsive to further movement of said throttle to excite said field from said battery through said second network, and said fourth switch being responsive to transmission speed adapted to close when said transmission speed exceeds a predetermined value and thus transfer maximum torque to said transmission through said clutch from said prime mover.

15. Clutch control apparatus for a prime mover having a throttle for controlling the speed of said prime mover, comprising an electrical generator driven by said prime mover and having a potential output which is a function of the prime mover speed, said generator having an armature and a field, a clutch responsive to an increasing electrical potential to transfer increased torque to a transmission, a first electrical network including a first and a second switch and interconnecting said cltuch and said armature, a second electrical network including a third switch and interconnecting said field and a storage battery, and a third electrical network including a fourth switch and interconnecting the clutch and said battery, said first switch being responsive to initial movement of said throttle to close and thus progressively energize said clutch member in response to increasing prime mover speed, said second switch being adapted to open when the transmission speed exceeds a predetermined value, said third switch being responsive to further movement of said throttle to excite said field from said battery through said second network, said fourth switch being responsive to transmission speed adapted to close when said transmission speed exceeds a predetermined value and thus transfer maximum torque to said transmission through said clutch from said prime mover, and a resistance shunted across said second switch.

16. Clutch control apparatus for a prime mover having a throttle for controlling the speed of said prime mover, comprising an electrical generator driven by said prime mover and having a potential output which is a function of the prime mover speed, said generator having an armature and a field, a clutch responsive to an increasing electrical potential to transfer increased torque to a transmission, a first electrical network including a first and a second switch and interconnecting said clutch and said armature, a second electrical network including a third switch and a resistance and interconnecting said field and a storage battery, and a third electrical network including a fourth switch and interconnecting the clutch and said battery, said first switch being responsive to initial movement of said throttle to close and thus progressively energize said clutch member in response to increasing prime mover speed, said second switch being adapted to open when the transmission speed exceeds a predetermined value, said third switch being responsive to further movement of said throttle to excite said field from said battery through said second network, said third switch being responsive to still further throttle actuation to shunt said resistance, said fourth switch being responsive to transmission speed adapted to close when said transmission speed exceeds a predetermined value and thus transfer maximum torque to said transmission through said clutch from said prime mover.

MARTIN P. WINTHER.

REFERENCES CITED

The following references are of record in the file of this patent:

UNITED STATES PATENTS

| Number | Name | Date |
|---|---|---|
| 732,944 | Jenatzy | July 7, 1903 |
| 1,946,200 | Easter | Feb. 6, 1934 |
| 1,963,642 | Beauchamp | June 19, 1934 |
| 2,094,449 | Forichon | Sept. 28, 1937 |
| 2,202,378 | Hertrich | May 28, 1940 |
| 2,214,901 | Griffin | Sept. 17, 1940 |
| 2,223,210 | Kefel | Nov. 26, 1940 |
| 2,459,829 | Maxwell | Jan. 25, 1949 |

FOREIGN PATENTS

| Number | Country | Date |
|---|---|---|
| 26,574 | Great Britain | 1909 |
| 326,921 | Great Britain | Mar. 27, 1937 |